US011194858B1

(12) United States Patent
Liu et al.

(10) Patent No.: US 11,194,858 B1
(45) Date of Patent: *Dec. 7, 2021

(54) AUDIO BIBLE PLAYER WITH A NUMERICAL INDEXING SYSTEM

(71) Applicants: Guangtian Liu, Fremont, CA (US); Jinqiang Lai, Fremont, CA (US)

(72) Inventors: Guangtian Liu, Fremont, CA (US); Jinqiang Lai, Fremont, CA (US)

(73) Assignees: Guangtian Liu, Fremont, CA (US); Jinqiang Lai, Fremont, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/878,417

(22) Filed: Jan. 24, 2018

Related U.S. Application Data

(63) Continuation-in-part of application No. 14/798,472, filed on Jul. 14, 2015, now Pat. No. 9,911,356.

(Continued)

(51) Int. Cl.
*G06F 16/68* (2019.01)
*G06F 15/02* (2006.01)
(Continued)

(52) U.S. Cl.
CPC ............ *G06F 16/686* (2019.01); *G06F 3/165* (2013.01); *G06F 15/025* (2013.01); *G06F 16/61* (2019.01)

(58) Field of Classification Search
CPC .......... G06F 17/30749; G06F 17/3074; G06F 17/30778; G06F 17/289; G06F 17/2827; G06F 13/385; G06F 13/387; G06F 17/2735; G06F 17/277; G06F 17/2836; G06F 3/018; G06F 3/0235; G06F 3/0484; G06F 3/0605; G06F 3/0607; G06F 3/0613; G06F 3/0661; G06F 3/0664; G06F 3/0676; G06F 3/068; G06F 17/211; G06F 17/2264; G06F 17/271; G06F 17/2715; G06F 17/2755; G06F 17/2872; G06F 17/30887; G06F 3/0483; G06F 3/04886; G06F 15/025; G06F 15/0291; G06F 17/21; G06F 17/218; G06F 17/22; G06F 17/2241; G06F 17/2288; G06F 17/24; G06F 17/241; G06F 17/2785; G06F 17/2818; G06F 17/2845; G06F 17/2854; G06F 17/30286; G06F 17/30551; G06F 17/30554; G06F 17/30569;

(Continued)

(56) References Cited

U.S. PATENT DOCUMENTS 4,445,196 A * 4/1984 Gonet .................... G09B 19/00
715/205
4,970,680 A * 11/1990 Walters ............... G06F 15/0283
345/55

(Continued)

*Primary Examiner* — Sheree N Brown
(74) *Attorney, Agent, or Firm* — George Guosheng Wang; United States Research and Patent Firm

(57) ABSTRACT

The present invention provides audio bible players with a 6-digit or 5-digit numerical indexing system to the chapter level, or a 9-digit or 8-digit numerical indexing system to the verse level. Users can not only find a particular chapter or verse of the bible quickly, but also can switch to the same chapter or verse of a different translation easily for comparison study. They are easy and convenient to use, and are great tools for bible study, bible memorization, language study, and sharing bible with people speaking other languages.

20 Claims, 11 Drawing Sheets

Heavenly Brothers One Year Bible Plan

One Year Bible Schedule

January

| | | | | |
|---|---|---|---|---|
| 1/1 | Gen1 | Gen2 | Matt1 | Ps1 |
| 1/2 | Gen3 | Gen4 | Matt2 | Ps2 |
| 1/3 | Gen5 | Gen6 | Matt3 | Ps3 |
| 1/4 | Gen7 | Gen8 | Matt4 | Ps4 |
| 1/5 | Gen9 | Gen10 | Matt5 | Ps5 |
| 1/6 | Gen11 | Gen12 | Matt6 | Ps6 |
| 1/7 | Gen13 | Gen14 | Matt7 | Ps7 |
| 1/8 | Gen15 | Gen16 | Matt8 | Ps8 |
| 1/9 | Gen17 | Gen18 | Matt9 | Ps9 |
| 1/10 | Gen19 | Gen20 | Matt10 | Ps10 |
| 1/11 | Gen21 | Gen22 | Matt11 | Ps11 |
| 1/12 | Gen23 | Gen24 | Matt12 | Ps12 |
| 1/13 | Gen25 | Gen26 | Matt13 | Ps13 |
| 1/14 | Gen27 | Gen28 | Matt14 | Ps14 |
| 1/15 | Gen29 | Gen30 | Matt15 | Ps15 |
| 1/16 | Gen31 | Gen32 | Matt16 | Ps16 |
| 1/17 | Gen33 | Gen34 | Matt17 | Ps17 |
| 1/18 | Gen35 | Gen36 | Matt18 | Ps18 |
| 1/19 | Gen37 | Gen38 | Matt19 | Ps19 |
| 1/20 | Gen39 | Gen40 | Matt20 | Ps20 |

Related U.S. Application Data

(60) Provisional application No. 62/024,186, filed on Jul. 14, 2014.

(51) Int. Cl.
   *G06F 3/16* (2006.01)
   *G06F 16/61* (2019.01)

(58) Field of Classification Search
   CPC ......... G06F 17/30634; G06F 17/30675; G06F 17/30914; G06F 3/0219; G06F 3/0237; G06F 3/0482; G06F 3/04842; G06F 3/04847; G06F 3/1205; G06F 3/1206; G06F 3/1208; G06F 3/1237; G06F 3/1241; G06F 3/1242; G06F 3/1253; G06F 3/1275; G06F 3/165
   USPC ....................................................... 715/716
   See application file for complete search history.

(56) References Cited

U.S. PATENT DOCUMENTS

| | | | | |
|---|---|---|---|---|
| 5,871,238 | A * | 2/1999 | Furniss | B42D 1/00 283/36 |
| 5,987,451 | A * | 11/1999 | Oehm | G06F 15/0283 707/999.001 |
| 2003/0006969 | A1* | 1/2003 | Barras | G09B 5/02 345/169 |
| 2005/0243658 | A1* | 11/2005 | Mack | G04G 9/0064 368/223 |
| 2006/0069456 | A1* | 3/2006 | Stringer | G11B 33/025 700/94 |
| 2007/0282786 | A1* | 12/2007 | Block | G06F 16/40 |
| 2009/0240671 | A1* | 9/2009 | Torres | G06F 16/93 |
| 2010/0083162 | A1* | 4/2010 | Hernandez | G06F 1/1616 715/776 |
| 2010/0293498 | A1* | 11/2010 | Maxfield | G06F 3/0219 715/776 |
| 2012/0178066 | A1* | 7/2012 | Drum | G09B 17/04 434/245 |

\* cited by examiner

Heavenly Brothers One Year Bible Plan

One Year Bible Schedule

January

| | | | | |
|---|---|---|---|---|
| 1/1 | Gen1 | Gen2 | Matt1 | Ps1 |
| 1/2 | Gen3 | Gen4 | Matt2 | Ps2 |
| 1/3 | Gen5 | Gen6 | Matt3 | Ps3 |
| 1/4 | Gen7 | Gen8 | Matt4 | Ps4 |
| 1/5 | Gen9 | Gen10 | Matt5 | Ps5 |
| 1/6 | Gen11 | Gen12 | Matt6 | Ps6 |
| 1/7 | Gen13 | Gen14 | Matt7 | Ps7 |
| 1/8 | Gen15 | Gen16 | Matt8 | Ps8 |
| 1/9 | Gen17 | Gen18 | Matt9 | Ps9 |
| 1/10 | Gen19 | Gen20 | Matt10 | Ps10 |
| 1/11 | Gen21 | Gen22 | Matt11 | Ps11 |
| 1/12 | Gen23 | Gen24 | Matt12 | Ps12 |
| 1/13 | Gen25 | Gen26 | Matt13 | Ps13 |
| 1/14 | Gen27 | Gen28 | Matt14 | Ps14 |
| 1/15 | Gen29 | Gen30 | Matt15 | Ps15 |
| 1/16 | Gen31 | Gen32 | Matt16 | Ps16 |
| 1/17 | Gen33 | Gen34 | Matt17 | Ps17 |
| 1/18 | Gen35 | Gen36 | Matt18 | Ps18 |
| 1/19 | Gen37 | Gen38 | Matt19 | Ps19 |
| 1/20 | Gen39 | Gen40 | Matt20 | Ps20 |

 

Figure 1

| No. | Book | No. | Book | No. | Book |
|---|---|---|---|---|---|
| 01 | Genesis | 11 | 1 King | 21 | Ecclesiastes | 31 | Obadiah |
| 02 | Exodus | 12 | 2 King | 22 | Song of Solomon | 32 | Jonah |
| 03 | Leviticus | 13 | 1 Chronicles | 23 | Isaiah | 33 | Micah |
| 04 | Numbers | 14 | 2 Chronicles | 24 | Jeremiah | 34 | Nahum |
| 05 | Deuteronomy | 15 | Ezra | 25 | Lamentation | 35 | Habakkuk |
| 06 | Joshua | 16 | Nehemiah | 26 | Ezekiel | 36 | Zephaniah |
| 07 | Judges | 17 | Esther | 27 | Daniel | 37 | Haggai |
| 08 | Ruth | 18 | Job | 28 | Hosea | 38 | Zechariah |
| 09 | 1 Samuel | 19 | Psalms | 29 | Joel | 39 | Malachi |
| 10 | 2 Samuel | 20 | Proverbs | 30 | Amos | | |

Figure 4

| No. | Book | No. | Book | No. | Book |
|---|---|---|---|---|---|
| 01 | Matthew | 11 | Philippians | 21 | 1 Peter |
| 02 | Mark | 12 | Colossians | 22 | 2 Peter |
| 03 | Luke | 13 | 1 Thessalonians | 23 | 1 John |
| 04 | John | 14 | 2 Thessalonians | 24 | 2 John |
| 05 | Acts | 15 | 1 Timothy | 25 | 3 John |
| 06 | Romans | 16 | 2 Timothy | 26 | Jude |
| 07 | 1 Corinthians | 17 | Titus | 27 | Revelation |
| 08 | 2 Corinthians | 18 | Philemon | | |
| 09 | Galatians | 19 | Hebrew | | |
| 10 | Ephesians | 20 | James | | |

Figure 5

| No. | Book | No. | Book | No. | Book | No. | Book |
|---|---|---|---|---|---|---|---|
| 01 | Genesis | 11 | 1 King | 21 | Ecclesiastes | 31 | Obadiah |
| 02 | Exodus | 12 | 2 King | 22 | Song of Solomon | 32 | Jonah |
| 03 | Leviticus | 13 | 1 Chronicles | 23 | Isaiah | 33 | Micah |
| 04 | Numbers | 14 | 2 Chronicles | 24 | Jeremiah | 34 | Nahum |
| 05 | Deuteronomy | 15 | Ezra | 25 | Lamentation | 35 | Habakkuk |
| 06 | Joshua | 16 | Nehemiah | 26 | Ezekiel | 36 | Zephaniah |
| 07 | Judges | 17 | Esther | 27 | Daniel | 37 | Haggai |
| 08 | Ruth | 18 | Job | 28 | Hosea | 38 | Zechariah |
| 09 | 1 Samuel | 19 | Psalms | 29 | Joel | 39 | Malachi |
| 10 | 2 Samuel | 20 | Proverbs | 30 | Amos | | |

| No. | Book | No. | Book | No. | Book |
|---|---|---|---|---|---|
| 40 | Matthew | 50 | Philippians | 60 | 1 Peter |
| 41 | Mark | 51 | Colossians | 61 | 2 Peter |
| 42 | Luke | 52 | 1 Thessalonians | 62 | 1 John |
| 43 | John | 53 | 2 Thessalonians | 63 | 2 John |
| 44 | Acts | 54 | 1 Timothy | 64 | 3 John |
| 45 | Romans | 55 | 2 Timothy | 65 | Jude |
| 46 | 1 Corinthians | 56 | Titus | 66 | Revelation |
| 47 | 2 Corinthians | 57 | Philemon | | |
| 48 | Galatians | 58 | Hebrew | | |
| 49 | Ephesians | 59 | James | | |

AUDIO BIBLE PLAYER WITH A NUMERICAL INDEXING SYSTEM

CROSS-REFERENCE TO RELATED APPLICATIONS

This non-provisional application is a Continuation-in-Part of U.S. application Ser. No. 14/798,472 filed Jul. 14, 2015, which claims the benefit of provisional patent application Ser. No. 62/024,186, filed on Jul. 14, 2014, the entire disclosures of both applications are incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to an audio player with a multiple-digit numerical indexing system. Although the invention will be illustrated, explained and exemplified by audio Bible players of the Christian bible with 66 bible books, it should be appreciated that the present invention is also applied to Catholic bible, Orthodox bible, Jewish bible and the like with different numbers of bible books and different orders of bible book arrangement.

BACKGROUND OF THE INVENTION

Audio bibles have become more and more popular recently, with more than 20 dramatized and non-dramatized versions available for English translations alone.

There are several advantages for listening to audio bibles. There are many bible texts that are very difficult to read and pronounce, including many foreign people names and place names. A reader can easily overcome this by listening to audio bibles, and he/she can understand the bible content much better when both reading and listening to the bible. In addition, dramatized bible can make bible stories much more visualized than plain text bible.

Audio bibles are particularly useful for those whose preferred learning style is listening instead of reading, who have eyesight problems or reading difficulties. While many Christians today are suffering busy daily schedules and do not have enough time to read bible, they can easily find time to listen to audio bible when driving, cooking, and exercising, etc. Audio bibles are also great tools to assist bible memorization. If one listens to a passage again and again, it becomes easier to memorize it.

Moreover, it is also found recently that audio bibles are good English language learning tools for children. While it is difficult for a child at the age of 6 to read a chapter of an English bible, it is much easier for the child to listen to the same chapter. After listening to the same chapter several times and becoming familiar with the contents/words, the child can read and understand the corresponding text much easier. Since children love to listen to stories, they enjoy listening to dramatized audio bibles. Because bible has large vocabularies, children can learn the English language quickly while learning to the bible.

While CD players, MP3 players, smart phones/tablets can be used to play audio bibles, there are several disadvantages. For example, if you have only one CD player, e.g. in your living room, you can only listen to audio bibles at where it is located. You also need to change disks frequently in order to listen to different books. If you have two CD players, e.g. one in your living room and another one in your car, you have to carry CDs around in order to play at both places, which is very inconvenient. While MP3 players, smart phones/tablets are more convenient to play than CD players, their indexing system is not that convenient. They usually index by artist names, or album names, making it difficult to find a chapter of the bible because the whole bible has 66 books and 1189 chapters. Even if you put all the chapters of one book into one album, you still need to go through a 66 book album menu first and then search for chapters. For a Psalm album, there are as many as 150 chapters to choose from. It can also make your MP3 player very crowded and difficult to find other contents.

In order to play on MP3 players, and smart phones/phones, you may also need to go through the hassle to set up each audio bible file properties correctly in order that they may go into the right albums. It is not easy to do this right with 1189 audio bible files. That's why there are still some people who prefer to use CD players.

It is common for Christians who follow one-year bible reading plans to read different chapters from different books each day, e.g. two Old Testament history book chapters, one Psalm or Proverb chapter, and one New Testament chapter (See FIG. 1 for a bible reading plan example). The MP3 player, smart phone/tablet indexing system makes it difficult to jump to different chapters of different books back and forth.

Another major disadvantage of smart phones/tablets is temptation and distraction. While smart phones/tablets are becoming more and more powerful today, it is also very easy to waste time on emails, social media, and games, etc. That's why the average US smart phone users are spending 2-3 hours a day on their phones. As a result, it is very difficult to have a quality/focused time to study/listen to the bible on smart phones. If you give a child a smart phone to listen to audio bible, it is most likely that he/she will be tempted to play games, etc.

Moreover, smartphones and tablets are usually expensive and less affordable to some people. Even some good MP3 players like iPod are very expensive.

In order to better study bible and get accurate meanings of particular verses, parallel text bibles are commonly used, in which two or more English bible translations are printed side by side for comparison study. If an audio bible player can play two or more English translations, it will be even more valuable for bible study.

Since US is a country with immigrants from all over the world, there are many bilingual Christians/Churches, e.g. English/Spanish, English/Chinese, etc. Bilingual parallel text bibles are also commonly used. When the same bible text in two different languages is compared side by side, it is much easier to understand the actual meaning. It is also used as an effective tool to learn another language. If you understand the bible text well in one language, it is much easier for you to understand the same text in another language. As of 2017, there are audio bible recordings in almost 1000 languages. If there are bilingual or multilingual audio bible players available, they can be great tools to learn the bible, to learn different languages, and to share bible with people in other languages all over the world.

As almost all audio bible recordings are produced on a chapter basis, most audio bible players are indexed to the chapter level only. But there are significant advantages if a player can index to the verse level. Most of the bible quotations in preaching and books are at the verse level, e.g. John 3:16. If an audio bible player can go to a particular verse easily, it will be even more convenient to use.

For parallel audio bible players, whether loaded with different English translations or different language translations, if one not only can find a particular verse quickly, but also can switch to the same verse of another translation quickly, one can easily compare the same verse in different translations. It will be a much more useful tool to study bible and another language.

In term of bible memorization, this is also very important. If one player can repeat a verse, instead of a chapter, again and again, the listener can easily divide the big task of memorizing a whole chapter into smaller tasks of memorizing verse by verse. This will become a powerful tool for children who participate in US national bible memorization competitions like Bible Bee or Bible Bowl.

Because of the advantages of a dedicated audio bible player, there are several different audio bible players available in the market, e.g. GoBible Original (by GoBible LLC, Amazon.com product number: ASIN B001BKV06G.), My-ibible (by Hendrickson Publisher, Amazon.com product number: ISBN-10: 1619706687, US patent application publication 2007/0282786), Franklin Speaking Bible (by Franklin Electronics, Amazon.com product number: ASIN B008EH7M84), etc. While they eliminate the hassle of loading MP3 files correctly by the user, and temptations and distractions of smart phone/tablets, there is no actual improvement of their indexing systems. FIG. 2 is an example of the indexing system. One still needs to spend time go through the menu/sub-menu to find a particular chapter of the bible out of a total of 66 books and 1189 chapters. It is also very inconvenient to jump to different books/chapters back and forth in order to follow a one year bible reading plan. US patent application publication 2006/0069456 also used the same indexing system with no improvement. A Chinese audio bible player (Amazon.com product number: B00W8ULNOC) uses a 4-digit numerical indexing system, in which the first chapter of the bible, Genesis 1, is given the number of 0001, and the last chapter of the bible, Revelation 22 is given the number of 1189. All other 1187 chapters use numbers in between based on their natural order in the whole bible. Even though a user can get around the traditional indexing menu to access any chapter of the bible quickly by entering a 4-digit number, it is impossible to remember all the 4-digit index numbers, and one has to refer to a printed menu for chapter index numbers all the time, which is very inconvenient.

Besides audio bible players, there are also electronic bibles available for displaying bible text only. In theory, they could use the same indexing system as an audio bible player, except that they will display bible texts. While there were several attempts in US patents and US patent application publications to improve the indexing system of electronic bible, none of them are that successful. In U.S. Pat. No. 5,987,451, and US patent application publications 2009/0240671A1, 2010/0083162A1, 2003/0006969A1, 66 buttons are used for 66 bible books, which is too complicated to implement and use. U.S. Pat. No. 4,970,680 proposed a computerized bible with full keyboard, which is also complicated with no actual indexing improvement. U.S. Pat. No. 4,445,196 proposed a numerical system in which each of the 66 books would be assigned a book number based on the book name alphabetical order. Because it is difficult to remember, it has not been implemented on any real products. As a result, most of the audio bible players and electronic bibles today are still using the traditional indexing system as illustrated in FIG. 2, which is inconvenient to use.

Despite the advantages of parallel audio bible players for different English translations or different language translations listed above, only the Hendrickson speaking bible can play two different English translations. But due to its inconvenient indexing system and its high cost/price, it has not been successful and is no long manufactured.

Despite the advantages promised by indexing to verse level, only the Gobible Original can index to verse level. However, it didn't make any fundamental improvement to the indexing system other than adding one more sub menu for verses as illustrated in FIG. 3. As a result, it is still difficult to use. Also, it didn't claim other benefits of being able to index to verse level as it couldn't play more than one translation on the same player.

Therefore, there exists a need to have a dedicated audio player with a more convenient indexing system to play audio bibles, which can overcome the aforementioned problems.

SUMMARY OF THE INVENTION

One aspect of the present invention provides an audio bible player with a numerical indexing system comprising at least 5 digits (such as consisting of 5 digits, or consisting of 6 digits, or consisting of 8 digits, or consisting of 9 digits). The audio bible player includes (i) a memory which stores all audio bible files; (ii) a controller which interprets the numerical indexing system for each chapter of the audio bible, in which a first digit and a second digit of said 5 digits represent a book number, and last three digits of said 5 digits represent a chapter number; (iii) a numeric keypad for a human operator to input said first digit, said second digit, and said last three digits of a bible chapter; and (iv) a speaker or an earphone which plays out the sound from the audio files. The controller receives said first digit, said second digit, and said last three digits from said numeric keypad, and interprets said first digit, said second digit, and said last three digits according to said numerical indexing system to find a corresponding audio bible chapter file, and controls said speaker or said earphone to play out sound from the audio bible chapter file.

A first group of embodiments in this aspect provides an audio bible player with a numerical indexing system consisting of 5 digits (or simply "5-digit numerical indexing system"). The audio bible player may further include two dedicated keys for selecting either Old Testament or New Testament. Alternatively, the audio bible player may further include a single switchable key for switching back and forth between Old Testament and New Testament selections.

A second group of embodiments in this aspect provides an audio bible player with a numerical indexing system consisting of 6 digits (or simply "6-digit numerical indexing system"). In the second group of embodiments, the player includes a memory which stores all audio bible files; a controller which interprets the 6-digit numerical indexing system for each chapter of the audio bible, in which a first digit of said 6-digit numerical indexing system represents Old Testament or New Testament, a second digit and a third digit of said 6-digit numerical indexing system represent a book number within Old Testament or New Testament, and last three digits of said 6-digit numerical indexing system represent a chapter number; a numeric keypad for a human operator to input said first digit, said second digit, said third digit and said last three digits of a bible chapter; and a speaker or an earphone which plays out the sound from the audio files. The controller receives said first digit, said second digit, said third digit and said last three digits from said numeric keypad, and interprets said first digit, said second digit, said third digit and said last three digits according to said 6-digit numerical indexing system to find a corresponding audio bible chapter file, and controls said speaker or said earphone to play out sound from the audio bible chapter file.

Another aspect of the present invention provides an audio bible player with a numerical indexing system comprising 8 digits. The player includes (1) a memory which stores all audio bible files; (2) a controller which interprets the numerical indexing system for each verse of the audio bible, in which a first digit and a second digit of said 8 digits represent a book number, a third digit, a fourth digit, and a fifth digit of said 8 digits represent a chapter number, and last three digits of said 8 digits represent a verse number; (3) a numeric keypad for a human operator to input said first digit, said second digit, said third digit, said fourth digit, said fifth digit, and said last three digits of a bible verse; and (4) a speaker or an earphone which plays out the sound from the audio files. The controller receives said first digit, said second digit, said third digit, said fourth digit, said fifth digit, and said last three digits from said numeric keypad, and interprets said first digit, said second digit, said third digit, said fourth digit, said fifth digit, and said last three digits according to said numerical indexing system to find a corresponding audio bible verse file, and controls said speaker or said earphone to play out sound from the audio bible verse file.

A first group of embodiments in this aspect provides an audio bible player with a numerical indexing system consisting of 8 digits (or simply "8-digit numerical indexing system"). The audio bible player may further include two dedicated keys for selecting either Old Testament or New Testament. Alternatively, the audio bible player may further include a single switchable key for switching back and forth between Old Testament and New Testament selections.

A second group of embodiments in this aspect provides an audio bible player with a numerical indexing system consisting of 9 digits (or simply "9-digit numerical indexing system"). The player comprises a memory which stores all audio bible files; a controller which interprets the 9-digit numerical indexing system for each verse of the audio bible, in which a first digit of said 9-digit numerical indexing system represents old testament or new testament, a second digit and a third digit of said 9-digit numerical indexing system represent a book number, a fourth digit, a fifth digit and a sixth digit of said 9-digit numerical indexing system represent a chapter number, and last three digits of said 9-digit numerical indexing system represent a verse number; a numeric keypad for a human operator to input said first digit, said second digit, said third digit, said fourth digit, said fifth digit, said sixth digit, and said last three digits of a bible verse; and a speaker or an earphone which plays out the sound from the audio files. The controller receives said first digit, said second digit, said third digit, said fourth digit, said fifth digit, said sixth digit, and said last three digits from said numeric keypad, and interprets said first digit, said second digit, said third digit, said fourth digit, said fifth digit, said sixth digit, and said last three digits according to said 9-digit numerical indexing system to find a corresponding audio bible verse file, and controls said speaker or said earphone to play out sound from the audio bible verse file.

In various embodiments of all aspects of the invention, the bible is selected from Christian bible, Catholic bible, Orthodox bible, and Jewish bible.

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements. All the figures are schematic and generally only show parts which are necessary in order to elucidate the invention. For simplicity and clarity of illustration, elements shown in the figures and discussed below have not necessarily been drawn to scale. Well-known structures and devices are shown in simplified form, omitted, or merely suggested, in order to avoid unnecessarily obscuring the present invention. Although the invention will be illustrated, explained and exemplified by audio Bible players of the Christian bible with 66 bible books, it should be appreciated that the present invention is also applied to Catholic bible, Orthodox bible, Jewish bible and the like with different numbers of bible books and different orders of bible book arrangement.

FIG. 1 shows an example of one-year bible reading plan.

FIG. 4 is an illustration of Numerical book index within Old Testament.

FIG. 5 is an illustration of Numerical book index within New Testament.

FIG. 6 is an illustration of Numerical book index within the whole bible.

FIG. 7 shows a file system for the 6-digit indexing system in accordance with an exemplary embodiment of the present invention.

DETAILED DESCRIPTION OF THE PREFERRED EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement.

It is also to be understood that the terminology used herein is for the purpose of describing particular embodiments only, and is not intended to limit the scope of the invention. For example, when an element is referred to as being "on", "connected to", or "coupled to" another element, it can be directly on, connected or coupled to the other element or intervening elements may be present. In contrast, when an element is referred to as being "directly on", "directly connected to", or "directly coupled to" another element, there are no intervening elements present.

The present invention provides at least the following 20 exemplary embodiments.

Embodiment #1

Figure 9A:
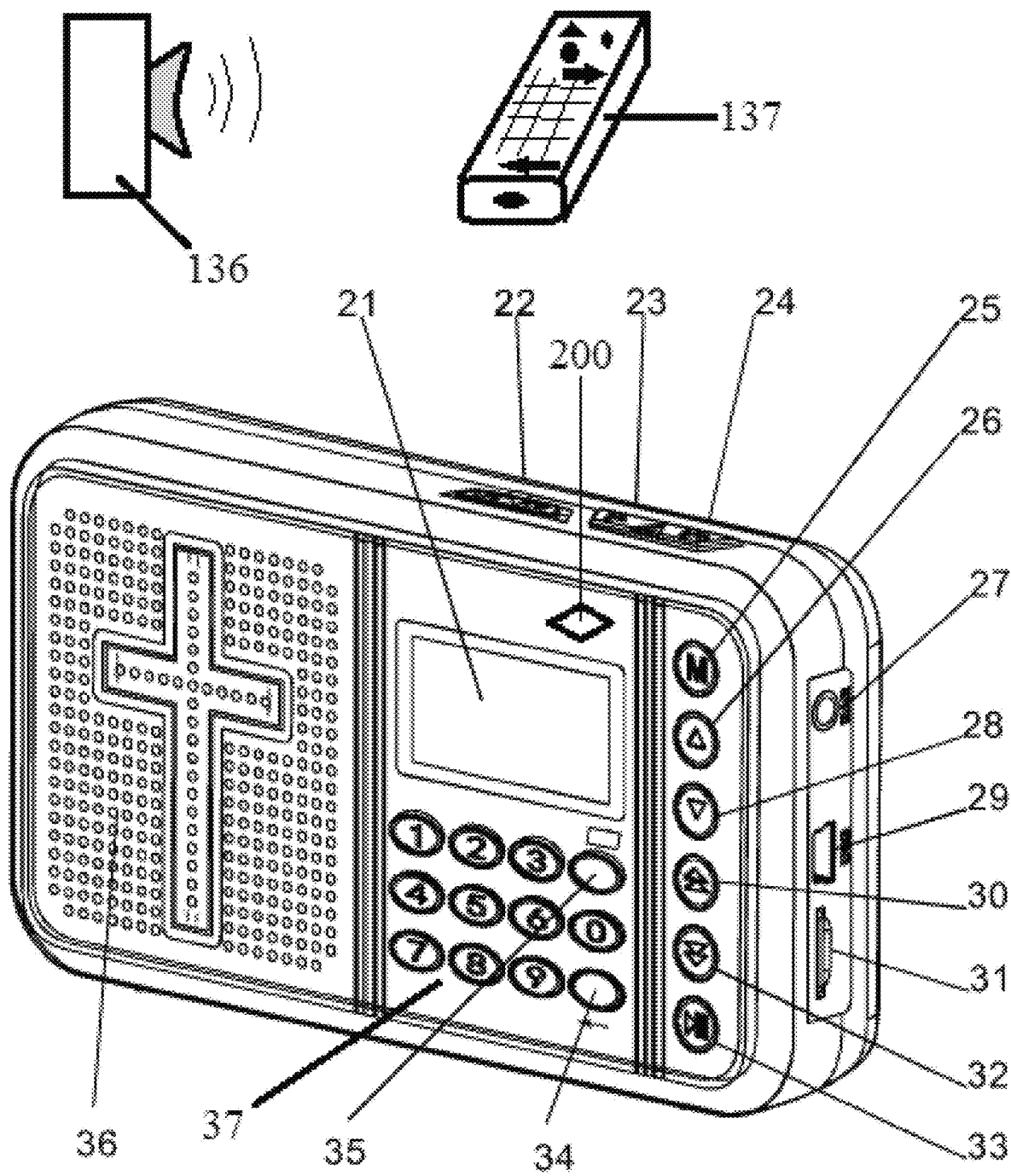
FIG. 9A is an oblique view of an audio bible player in accordance with an exemplary embodiment of the present invention.

An audio bible player with a numerical indexing system comprising (such as consisting of) 5 digits, which includes:
a memory which stores all audio bible files;
a controller which interprets the numerical indexing system for each chapter of the audio bible, in which a first digit and a second digit of said 5 digits represent a book number, and last three digits of said 5 digits represent a chapter number;
a numeric keypad (such as numeric keypad 37 as shown in FIG. 9A) for a human operator to input said first digit, said second digit, and said last three digits of a bible chapter; and
a speaker (such as speaker 36 as shown in FIG. 9A) or an earphone which plays out the sound from the audio files;
wherein said controller receives said first digit, said second digit, and said last three digits from said numeric keypad, and interprets said first digit, said second digit, and said last three digits according to said numerical indexing system to find a corresponding audio bible chapter file, and controls said speaker or said earphone to play out sound from the audio bible chapter file.

Embodiment #2

The audio bible player according to Embodiment #1, wherein the numerical indexing system further includes a preliminary digit (such as making the numerical indexing system consisting of 6 digits), and wherein the preliminary digit represents Old Testament or New Testament; wherein when the preliminary digit represents Old Testament, said book number is book number within Old Testament; and wherein when the preliminary digit represents New Testament, said book number is book number within New Testament.

Embodiment #3

The audio bible player according to Embodiment #1, further including two dedicated keys for Old Testament and New Testament selections, or a single switchable key for switching back and forth between Old Testament and New Testament selections; wherein when Old Testament is selected, said book number is book number within Old Testament; and wherein when New Testament is selected, said book number is book number within New Testament.

Embodiment #4

The audio bible player according to Embodiment #1, wherein the memory stores all audio bible files of multiple bible translations/versions, wherein the player further comprises a change/selection key for a human operator to input a bible translation/version change/selection command, and wherein said controller receives said bible translation change/selection command, and finds the audio bible file of the same chapter of a different translation/version, and controls said speaker or said earphone to play out sound from the audio bible chapter file.

Embodiment #5

The audio bible player according to Embodiment #1, further comprising two bible book navigation keys that enable a user to move from book to book back and forth in a sequential order, and two chapter navigation keys that enable a user to move from chapter to chapter back and forth in a sequential order.

Embodiment #6

The audio bible player according to Embodiment #1, wherein said memory further stores bible text files in a similar way as audio files, and said controller controls a display to display bible text that is synchronized with the audio bible being played.

Embodiment #7

The audio bible player according to Embodiment #1, wherein said controller is programmed to remember a last position it played when the audio bible player is turned off, and start playing automatically from said last position whenever said audio bible player is turned on again.

Embodiment #8

The audio bible player according to Embodiment #1, further comprising a clock time display and an alarm, wherein a user can enter both an alarm time and a numerical index of a bible chapter when the user is setting up the alarm, and said controller stores the alarm time and the numerical index in the memory, and wherein, when the alarm time comes, said controller finds the corresponding audio bible file based on the stored numerical index, controls said output speaker or said earphone to play out the sound of the audio file, so the user can be woken up by the bible chapter the user entered in setting up the alarm.

Embodiment #9

The audio bible player according to Embodiment #1, wherein said book number is book number within the whole bible; or wherein the numeric keypad is built in a remote control device (such as 137 as shown in FIG. 9A), the speaker is a Bluetooth speaker (such as 136 as shown in FIG. 9A), and the earphone (such as 136 as shown in FIG. 9A) is a Bluetooth earphone.

Embodiment #10

The audio bible player according to Embodiment #1, wherein the bible is selected from Christian bible, Catholic bible, Orthodox bible, and Jewish bible.

Embodiment #11

An audio bible player with a numerical indexing system comprising 8 digits, which includes a memory which stores all audio bible files;

a controller which interprets the numerical indexing system for each verse of the audio bible, in which a first digit and a second digit of said 8 digits represent a book number; a third digit, a fourth digit, and a fifth digit of said 8 digits represent a chapter number; and last three digits of said 8 digits represent a verse number;

a numeric keypad (such as numeric keypad 37 as shown in FIG. 9A) for a human operator to input said first digit, said second digit, said third digit, said fourth digit, said fifth digit, and said last three digits of a bible verse; and a speaker (such as speaker 36 as shown in FIG. 9A) or an earphone which plays out the sound from the audio files;

wherein said controller receives said first digit, said second digit, said third digit, said fourth digit, said fifth digit, and said last three digits from said numeric keypad, and interprets said first digit, said second digit, said third digit, said fourth digit, said fifth digit, and said last three digits according to said numerical indexing system to find a corresponding audio bible verse file, and controls said speaker or said earphone to play out sound from the audio bible verse file.

Embodiment #12

The audio bible player according to Embodiment #11, wherein the numerical indexing system further includes a preliminary digit, and wherein the preliminary digit represents Old Testament or New Testament; wherein when the preliminary digit represents Old Testament, said book number is book number within Old Testament; and wherein when the preliminary digit represents New Testament, said book number is book number within New Testament.

Embodiment #13

The audio bible player according to Embodiment #11, further including two dedicated keys for Old Testament and New Testament selections, or a single switchable key for switching back and forth between Old Testament and New Testament selections; wherein when Old Testament is selected, said book number is book number within Old Testament; and wherein when New Testament is selected, said book number is book number within New Testament.

Embodiment #14

The audio bible player according to Embodiment #11, wherein the memory stores all audio bible files of multiple bible translations/versions, wherein the player further comprises a change/selection key for a human operator to input a bible translation/version change/selection command, and wherein said controller receives said bible translation change/selection command, and finds the audio bible file of the same verse of a different translation/version, and controls said speaker or said earphone to play out sound from the audio bible verse file.

Embodiment #15

The audio bible player according to Embodiment #11, further comprising two bible book navigation keys that enable a user to move from book to book back and forth in a sequential order, two chapter navigation keys that enable a user to move from chapter to chapter back and forth in a sequential order, and two verse navigation keys that enable a user to move from verse to verse back and forth in a sequential order.

Embodiment #16

The audio bible player according to Embodiment #11, wherein said memory further stores bible text files in a similar way as audio files, and said controller controls a display to display bible text that is synchronized with the audio bible being played.

Embodiment #17

The audio bible player according to Embodiment #11, wherein said controller is programmed to remember a last position it played when the audio bible player is turned off, and start playing automatically from said last position whenever said audio bible player is turned on again.

Embodiment #18

The audio bible player according to Embodiment #11, further comprising a clock time display and an alarm, wherein a user can enter both an alarm time and said numerical index of a bible verse when the user is setting up the alarm, and said controller stores the alarm time and the numerical index in the memory, and wherein, when the alarm time comes, said controller finds the corresponding audio bible file based on the stored numerical index, controls said output speaker or said earphone to play out the sound of the audio file, so the user can be woken up by the bible verse the user entered in setting up the alarm.

Embodiment #19

The audio bible player according to Embodiment #11, wherein said book number is book number within the whole bible; or wherein the numeric keypad is built in a remote control device (such as 137 as shown in FIG. 9A), the speaker is a Bluetooth speaker (such as 136 as shown in FIG. 9A), and the earphone is a Bluetooth earphone (such as 136 as shown in FIG. 9A).

Embodiment #20

The audio bible player according to Embodiment #11, wherein the bible is selected from Christian bible, Catholic bible, Orthodox bible, and Jewish bible.

In the following description, for the purposes of explanation, numerous specific details are set forth in order to provide a thorough understanding of the Embodiments #14-20. These embodiments provide an audio bible player with a 6-digit or 5-digit numerical indexing system that can reach any chapter of the bible quickly and switch to the same chapter of different translations easily. These embodiments also provide audio bible player with a 9-digit or 8-digit numerical indexing system that can reach any verse of the bible quickly and switch to the same verse of different translations easily.

The 6-digit or 9-digit numerical indexes are based on natural book orders within Old Testament or within New Testament, and the 5-digit and 8-digit numerical indexes are based on natural book orders within the whole bible, and all the chapters numbers and verse numbers are based on natural chapter numbers within a book and natural verse numbers within a chapter. They are very easy to remember and play. One can go to any chapter or any verse of the bible very fast. One can also go the same chapter or verse of different translations easily. The numerical indexes also help users to remember the whole bible structure, which is very important to understand the content and context of each book. The audio players are simple to make, with much lower costs than smart phones/tablets. The audio players are great tools for bible study, language study, bible memorization and sharing bible in another language. Since Arabic numerals are understandable in almost any languages, audio bible players with numerical index can be used in any languages without the need of customizing the menu to the specific language.

Figure 2:
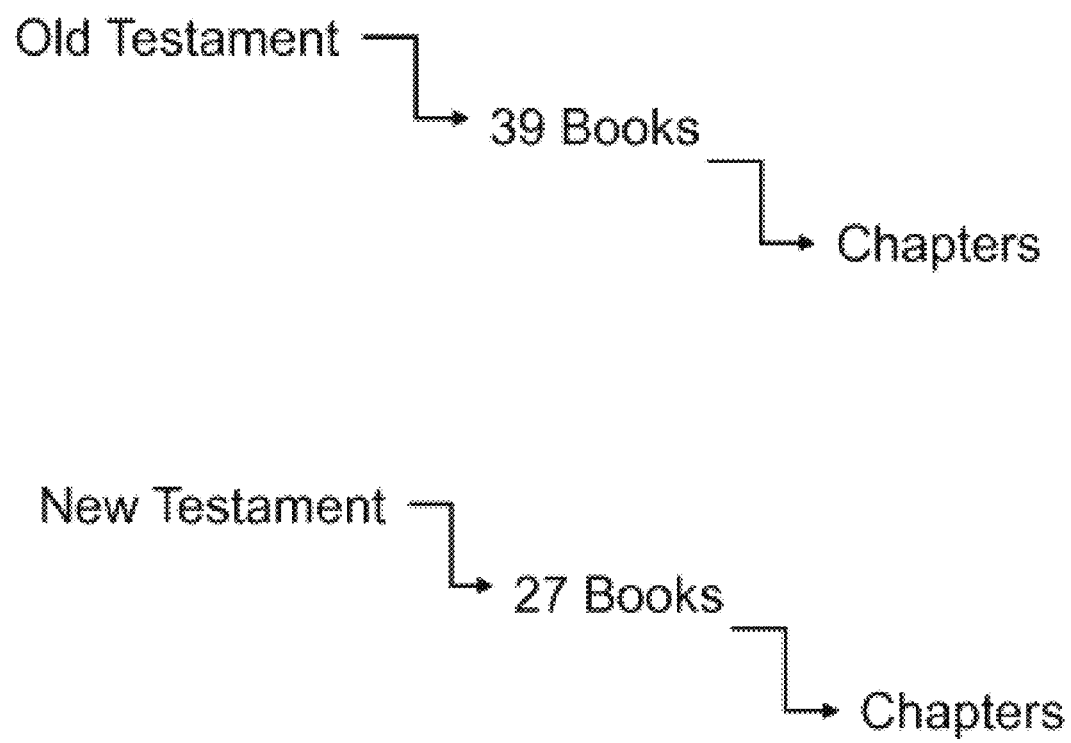
FIG. 2 illustrates a traditional audio bible indexing system down to the chapter level.
Figure 3:
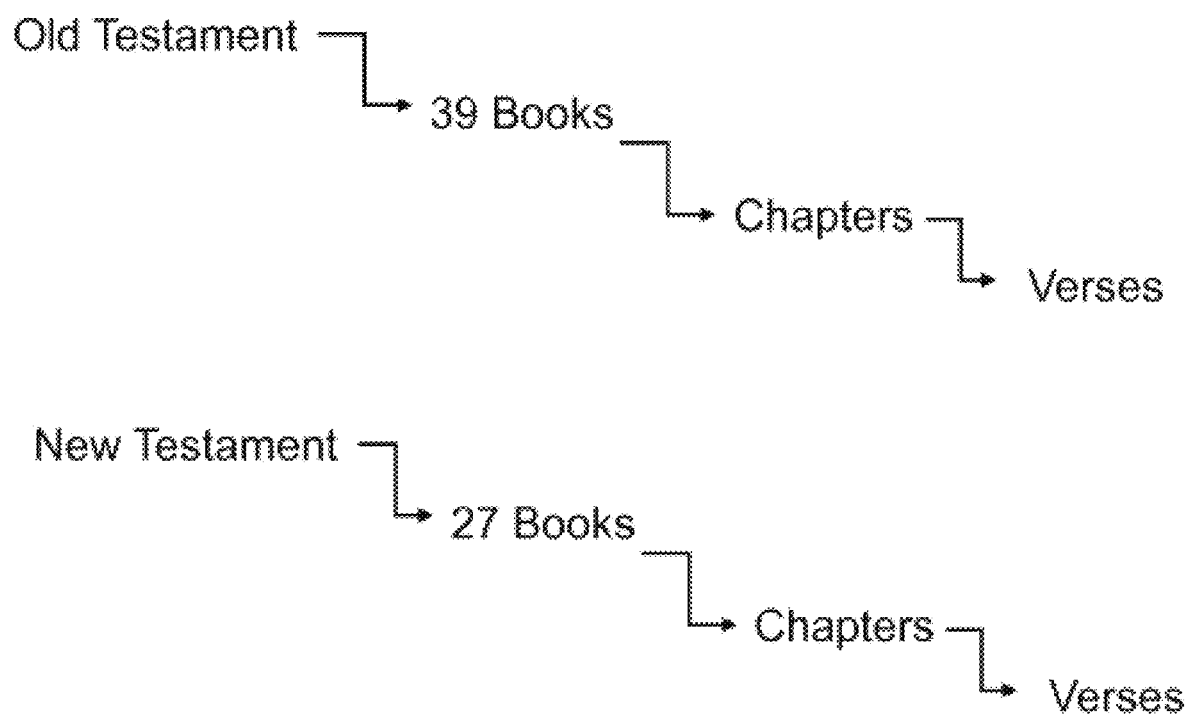
FIG. 3 illustrates a traditional audio bible indexing system down to the verse level.
Figure 8:
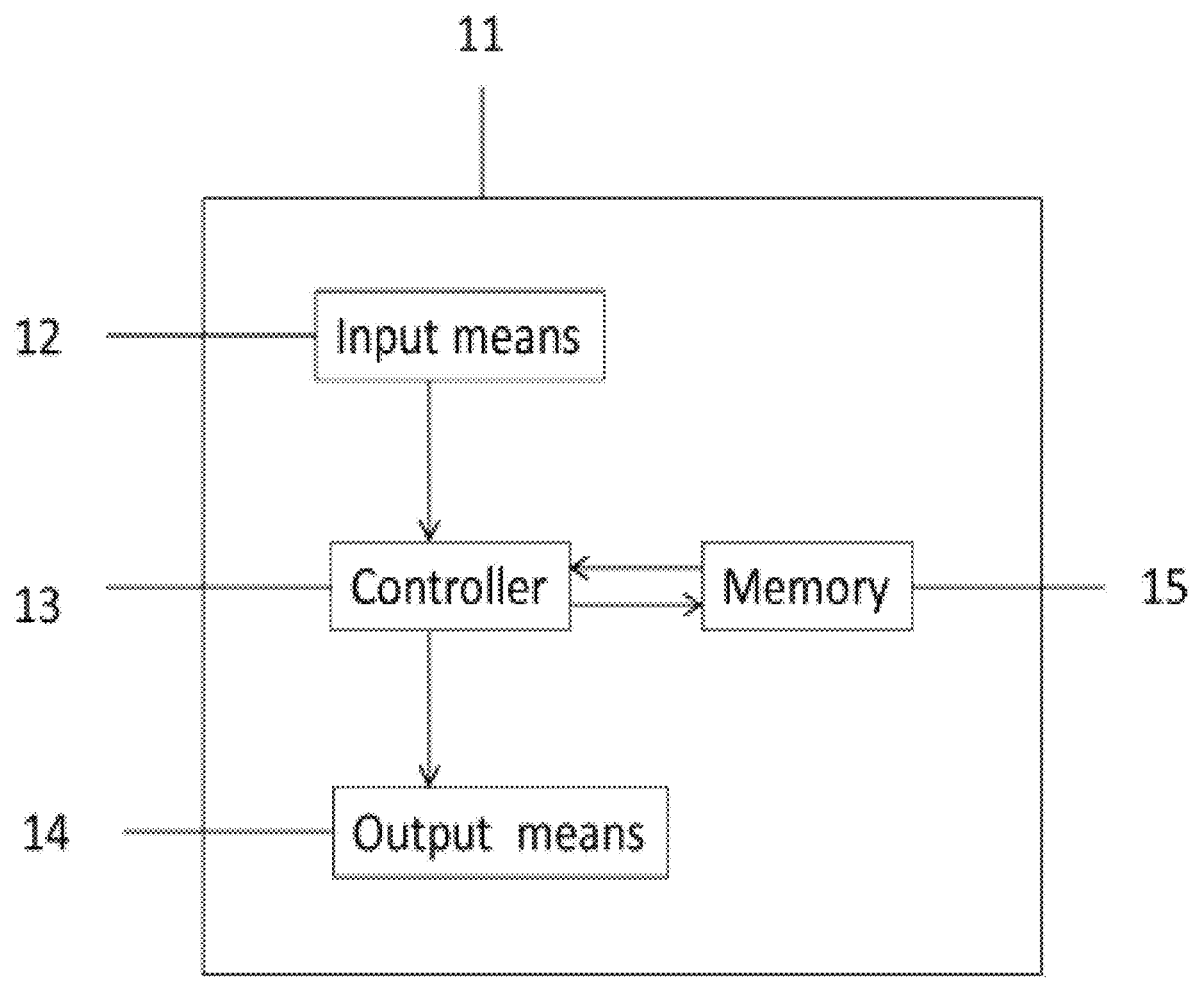
FIG. 8 depicts a flow chart showing how the audio bible player works in accordance with an exemplary embodiment of the present invention.

The reference numbers appeared in FIG. 8 represent the following components or functionality of the audio payer. 11: Audio Bible Player, 12: Input means; 13: Controller; 14: Output means; and 15: Memory.

The reference numbers appeared in FIG. 9A represent the following parts, components, buttons, switches, turning wheels, or other functionalities of the audio payer. 21: Display; 22: Power on/off Switch; 23: Volume Down; 24: Volume Up; 25: Bible Version/Translation Change Key; 26: Next Bible Book; 27: Earphone Hole; 28: Previous bible book; 29: USB port; 30: Last Chapter or Fast Backward within the same chapter, 31: Memory Card; 32: Next Chapter or Fast Forward within the same chapter; 33: Play/Pause; 34: Backspace; 35: Repeat; 36: Built-in Speaker, 37: Numeric Keypad; 136: Bluetooth speaker or earphone; and 137: a remote control device comprising numeric keypad.

First Embodiment

In this audio bible player, a 6-digit numerical indexing system is used: Each bible chapter is represented by a six digit number, a-bb-ccc, wherein a=1 represents Old Testament, a=2 represents New Testament, bb is the book number within in Old Testament as shown in FIG. 4 or within New Testament as shown in FIG. 5 based on the natural bible book orders; ccc is the chapter number, e.g. chapter 5 is represented by 005 and chapter 12 is represented by 012. All the zeros are necessary in order to make up a 3-digit number.

For example, we want to find the gospel of John chapter 3. Because the gospel of John is in the New Testament, a=2. Because the gospel of John is the 4th book in the New Testament, bb=04. For chapter 3, ccc=003. So, the 6-digit index for the gospel of John chapter 3 is 2-04-003.

Since there are only 66 book numbers, it won't be difficult to remember. At the beginning, a user can always refer to book numbers listed in a user manual. As he/she uses it more, he/she will be able to remember more and more book numbers naturally. There is also an additional benefit for remembering the book numbers. Since the book numbers correspond to the natural bible book order, the user will also be able to remember the whole structure of the bible, which is very important for bible study.

Figure 7:
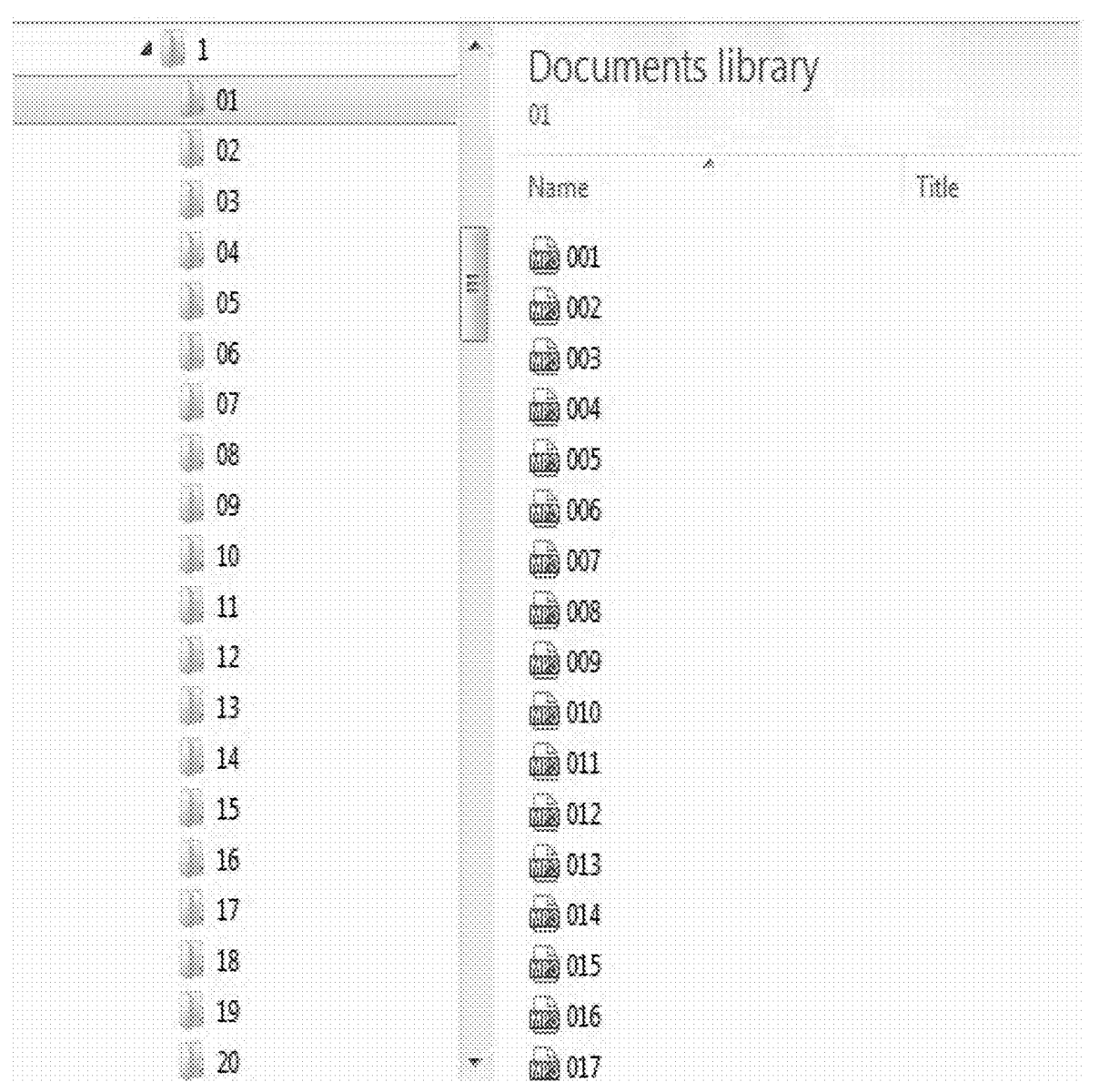

FIG. 7 is an embodiment of how different chapters of audio bible files are stored in the audio bible player memory for easy indexing access. In the root directory, there are two folders: "1" is for Old Testament and "2" is for New Testament. Since there are 39 books in the Old Testament, there are 39 subfolders under the Old Testament folder "1", with the subfolder names correspond to the book numbers. Under each subfolder, each chapter of this book is stored in one audio file with file names correspond to the 3-digit chapter numbers.

FIG. 8 is a flow chart showing how the audio bible player works. The player 11 includes a memory 15 which stores all audio bible files as described above; a controller 13 which interprets the 6-digit numerical indexing system for each chapter of the audio bible as described above, in which a first digit of said 6-digit numerical indexing system represents Old Testament or New Testament, a second digit and a third digit of said 6-digit numerical indexing system represent a book number, and last three digits of said 6-digit numerical indexing system represent a chapter number; an input means 13 such as a numeric keypad 37 and remote control device 137 as shown in FIG. 9A for a human operator to input said first digit, said second digit, said third digit and said last three digits of a bible chapter, and an output means 14 such as a built-in speaker 36 (or an earphone), and Bluetooth speaker/earphone 136 as shown in FIG. 9A, which play out the sound from the audio files. The controller 13 receives said first digit, said second digit, said third digit and said last three digits from input means 13 such as a numeric keypad 37 and remote control device 137 as shown in FIG. 9A, and interprets said first digit, said second digit, said third digit and said last three digits according to said 6-digit numerical indexing system to find a corresponding audio bible chapter file, and controls output means 14 to play out sound from the audio bible chapter file.

In operation, a user enters a six-digit bible chapter number using an input mean, e.g. a keypad such as a numeric keypad. For the gospel of John chapter 3, 2-04-003 is entered. The controller 13 will interpret this number based on the 6-digit numerical indexing system, and search in the memory. First, it will go into root folder "2", and then it will go into the subfolder "04" to find the audio file named "003". Finally, it will control the output means 14, e.g. a speaker or an earphone, to play out the sound of the audio file.

This audio bible player can also load and play multiple bible versions. For example, suppose that it is preloaded with English Standard Version (ESV) Old Testament and New Testament, and King James Version (KJV) Old Testament and New Testament. In the memory root directory, there will be four different folders. Folder "1" is for ESV Old Testament. Folder "2" is for ESV New Testament. Folder "3" is for KJV Old Testament. Folder "4" is for KJV New Testament.

For John chapter 3, the numerical index would be 2-04-003 for the ESV version, and 4-04-003 for KJV version. The difference is only the first digit, making it very easy for a user to remember and to switch from one version to the same chapter of another version. Or, using an input means, e.g. a special "bible version/translation change" key #25 in FIG. 9A, a user can send a command to the controller to change bible version. After receiving this command, the controller would automatically find and play the same chapter of a different bible version. If there are more than two versions loaded, it would switch to the same chapter of the next available version if the user presses this key again. This is a very convenient multiple bible version playback function.

The Audio bible player may also be programmed to remember the last position it played. So, whenever the play is turned off and turned on again, it would start playing automatically from where it was turned off.

As shown in FIG. 9A, a user can use the number keys in numeric keypad 37 or remote control 137 to enter the 6-digit numerical index of a chosen chapter, and then press "start" button 33 to start playing. There are two supplement book navigation keys, 26 and 28, that enable a user to move from book to book back and forth in a sequential order. There are also two supplement chapter navigation keys, 20 and 32, that enable a user to move from chapter to chapter back and forth in a sequential order. When the 6-digit numerical indexing system is combined with book/chapter navigation keys, it offers a user more flexibility to find a chapter of the bible. The navigation keys are very important for those who are not familiar with the numerical indexing system initially. If a user cannot remember the exact numerical numbers and only know approximately what they are, he/she can enter a number based on his/her best knowledge, and then use these navigation keys to make adjustment to find the exact chapter he/she is looking for. Additionally or alternatively, two supplement book navigation keys 26 and 28 as well as two supplement chapter navigation keys 20 and 32 may be built in remote control device 137.

Figure 9B:
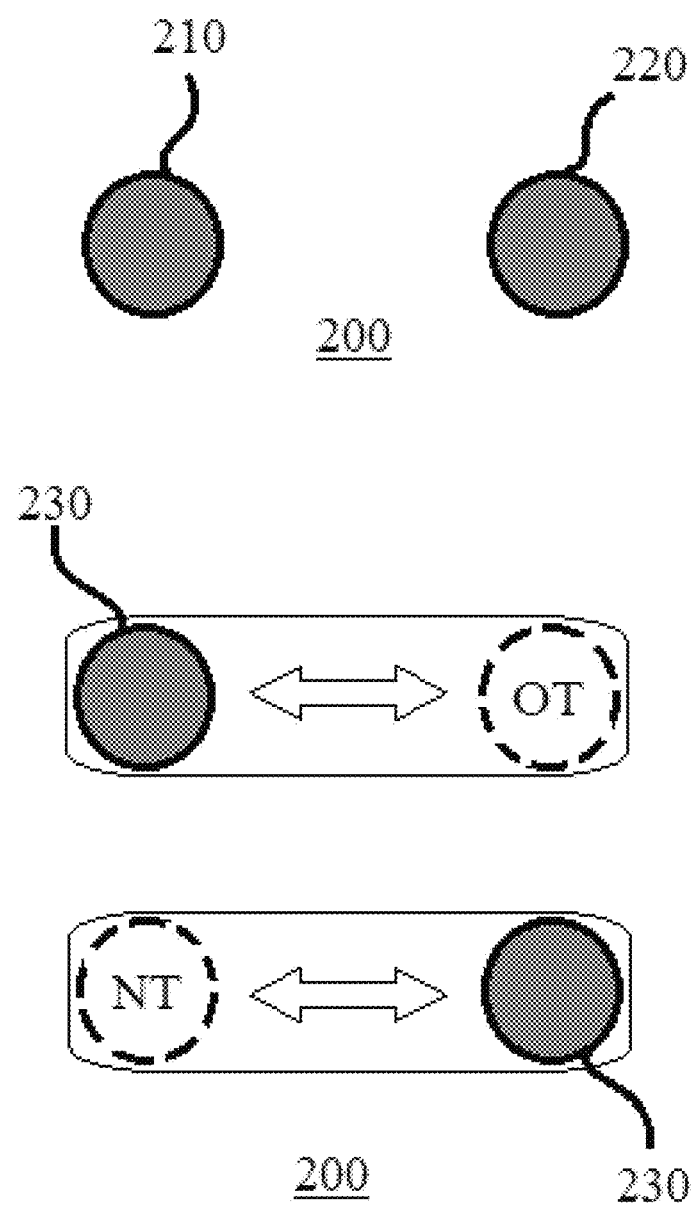
FIG. 9B schematically illustrates two designs of Old/New Testament Selector 200 of an audio bible player in accordance with an exemplary embodiment of the present invention.
Figure 10:
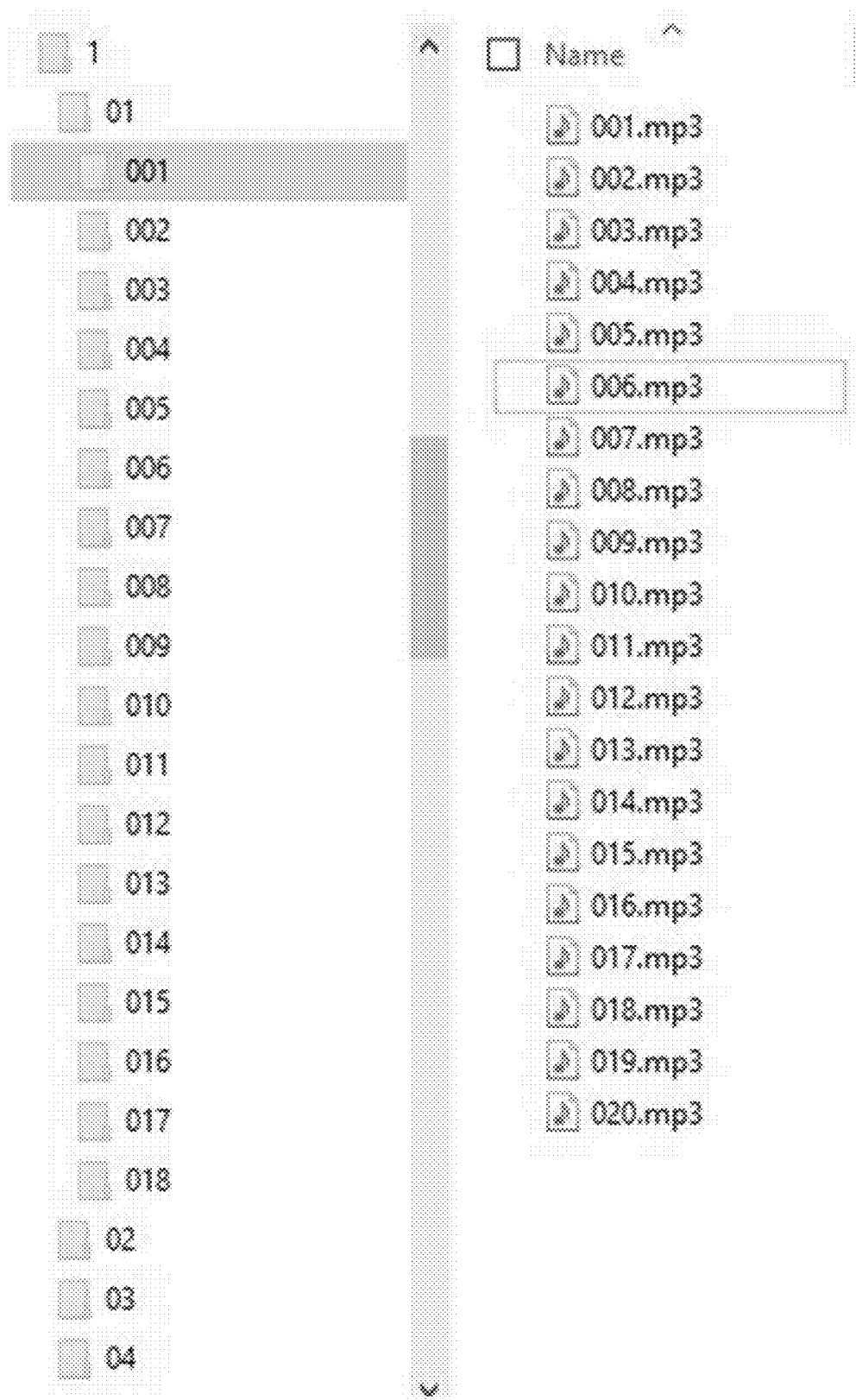
FIG. 10 shows a file system for the 9-digit indexing system in accordance with an exemplary embodiment of the present invention.

A 9-digit numerical indexing system may be employed in a format of "a-bb-ccc-ddd" that is able to go to the verse level using the same hardware of FIG. 8, FIG. 9A, and FIG. 9B. While the first six numbers are the same as the 6-digit indexing system, the last three numbers ddd will represent verse number. To support this 9-digit numerical indexing system, the file structure of FIG. 7 can be modified into that of FIG. 10. The audio recording of each verse is stored into a file with the file name the same as the verse number, while all verse audio files of the same chapter are stored under one sub folder with the folder name the same as the chapter number. Audio bible players with the 9-digit numerical indexing system can claim the full benefit of being able to play multiple translations/versions, as described above for the 6-digit numerical indexing system.

In some embodiments, the player is modified to display bible text in synchronized with playing the bible audibly. Users can read a verse on the display while listening to the same verse.

In some embodiments, clock and alarm functions are added to the player. For the alarm, it will allow a user to store a numerical index of his/her preferred chapter, e.g. a Psalm 23, when setting up the alarm. So, the user can be waked up by his/her preferred bible chapter.

The present invention also provides an audio bible with a 5-digit or 8-digit numerical indexing system. Instead of using the book numbers within Old Testament or within New Testament, they use book numbers within the whole bible as shown in FIG. 6. For example, the gospel of John book number within New Testament is 04 as shown in FIG. 5, while the within the whole bible is 43 as shown in FIG. 6. In a 6-digit indexing system, the gospel of John chapter 3 indexing number is 2-04-003. But in a 5-digit indexing system, it becomes 43-003. The first digit that represents Old Testament or New Testament in the 6-digit indexing system is no longer needed.

The present invention may also use the 5-digit or 8-digit indexing system for an electronic text bible to reach a chapter text or a verse text quickly.

Regarding an audio bible player with a 5-digit numerical indexing system or 8-digit numerical indexing system, it may be made by substituting the first digit of the 6-digit numerical indexing system or the 9-digit numerical indexing system as described above, with a Testament Selector 200 as shown in FIG. 9A. Referring to FIG. 9B, Testament Selector 200 may be two dedicated keys 210 and 220 representing Old Testament and New Testament respectively, one of which can be turned on while another turned off. Key 210 representing Old Testament is equivalent to using the number "1" above and another key 220 representing New Testament is equivalent to using the number "2" above. Alternatively, Testament Selector 200 may be one dedicated key 230 that can switch back and forth from Old Testament (OT) to New Testament (NT) or New Testament (NT) to Old Testament (OT).

The audio bible player of the present invention can be used to play other audio files, e.g. music, preaching messages. The user just needs to load audio files into different folders and assign numerical indexes that are consistent with their folder locations and file names. Alternatively, the audio bible player of the present invention can be used as a language study tool. The user can load the same reading of different languages. When the "Bible version/translation change key" 25 is pressed, it would switch to different languages for comparison. When text of the reading is displayed that is synchronized with the audio play, a user can read while listening.

Audio bible players with a 6-digit or 5-digit numerical indexing system to the bible chapter level or a 9-digit or 8-digit numerical indexing system to the bible verse level have been described above. Users can not only find a particular chapter or verse of the bible quickly, but also can switch to the same chapter or verse of a different translation easily for comparison study. They are easy and convenient to use, and are great tools for bible study, bible memorization, language study, and sharing bible with people speaking other languages.

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction. The invention is not only applied to Christian bible, but also applied to Catholic bible, Orthodox bible, Jewish bible and the like except with different numbers of bible books and different orders of bible book arrangement.

The invention claimed is:

1. An audio bible player, comprising:
  a memory which stores all audio bible files;
  a numerical indexing system comprising 5 digits, in which a first digit and a second digit of said 5 digits represent a book number, and last three digits of said 5 digits represent a chapter number under said book number;
  a controller which interprets the numerical indexing system for each book and each chapter of the audio bible;
  a numeric keypad for a human operator to input a book number by inputting said first digit and said second digit, and input a chapter number under said book number by inputting said last three digits;
  a speaker or an earphone which plays out sounds from the audio files; and
  a repeat key that enables one player to repeat a verse in the Bible under said chapter number in said numerical indexing system, instead of the entire chapter, again and again;
  wherein said controller receives said first digit, said second digit, and said last three digits from said numeric keypad, and interprets said first digit, said second digit, and said last three digits according to said numerical indexing system to find a corresponding audio bible chapter file, and controls said speaker or said earphone to play out sound from the audio bible chapter file.

2. The audio bible player according to claim 1, wherein the numerical indexing system further includes a preliminary digit, and wherein the preliminary digit represents Old Testament or New Testament;
  wherein the preliminary digit represents Old Testament books of the bible, said book number is book number within Old Testament; and
  wherein the preliminary digit represents New Testament books of the bible, said book number is book number within New Testament.

3. The audio bible player according to claim 1, further including two dedicated keys for Old Testament and New Testament selections, or a single switchable key for switching back and forth between Old Testament and New Testament selections;
  wherein when Old Testament is selected, said book number is book number within Old Testament; and
  wherein when New Testament is selected, said book number is book number within New Testament.

4. The audio bible player according to claim 1, wherein the memory stores all audio bible files of multiple bible translations/versions, wherein the player further comprises a change/selection key for a human operator to input a bible translation/version change/selection command, and wherein said controller receives said bible translation change/selection command, and finds the audio bible file of the same chapter of a different translation/version, and controls said speaker or said earphone to play out sound from the audio bible chapter file.

5. The audio bible player according to claim 1, further comprising two bible book navigation keys that enable a user to move from book to book back and forth in a sequential order, and two chapter navigation keys that enable a user to move from chapter to chapter back and forth in a sequential order.

6. The audio bible player according to claim 1, wherein said memory further stores bible text files in a similar way as audio files, and said controller controls a display to display bible text that is synchronized with the audio bible being played.

7. The audio bible player according to claim 1, wherein said controller is programmed to remember a last position it played when the audio bible player is turned off, and start playing automatically from said last position whenever said audio bible player is turned on again.

8. The audio bible player according to claim 1, further comprising a clock time display and an alarm,
  wherein a user enters both an alarm time and a numerical index of a bible chapter to set up the alarm, and said controller stores the alarm time and the numerical index in the memory, and
  wherein said controller finds the corresponding audio bible file based on the stored numerical index, controls said output speaker or said earphone to play out the sound of the audio file, so the user is woken up at the alarm time by the bible chapter the user entered in setting up the alarm.

9. The audio bible player according to claim 1, wherein said book number is book number within the whole bible.

10. The audio bible player according to claim 1, wherein the bible is selected from Christian bible, Catholic bible, Orthodox bible, and Jewish bible.

11. An audio bible player, comprising:
a memory which stores all audio bible files;
a numerical indexing system comprising 8 digits, in which a first digit and a second digit of said 8 digits represent a book number, a third digit, a fourth digit, and a fifth digit of said 8 digits represent a chapter number under said book number; and last three digits of said 8 digits represent a verse number under said chapter number;
a controller which interprets the numerical indexing system for each book, each chapter and each verse of the audio bible;
a numeric keypad for a human operator to input a book number by inputting said first digit and said second digit, input a chapter number by inputting said third digit, said fourth digit and said fifth digit, and input a verse number by inputting said last three digits;
a speaker or an earphone which plays out sounds from the audio files; and
a repeat key that enables one player to repeat a verse in the Bible under said chapter number in said numerical indexing system, instead of the entire chapter, again and again;
wherein said controller receives said first digit, said second digit, said third digit, said fourth digit, said fifth digit, and said last three digits from said numeric keypad, and interprets said first digit, said second digit, said third digit, said fourth digit, said fifth digit, and said last three digits according to said numerical indexing system to find a corresponding audio bible verse file, and controls said speaker or said earphone to play out sound from the audio bible verse file.

12. The audio bible player according to claim 11, wherein the numerical indexing system further includes a preliminary digit, and wherein the preliminary digit represents Old Testament or New Testament;
  wherein the preliminary digit represents Old Testament books of the bible, said book number is book number within Old Testament; and
  wherein the preliminary digit represents New Testament books of the bible, said book number is book number within New Testament.

13. The audio bible player according to claim 11, further including two dedicated keys for Old Testament and New Testament selections, or a single switchable key for switching back and forth between Old Testament and New Testament selections;
  wherein when Old Testament is selected, said book number is book number within Old Testament; and
  wherein when New Testament is selected, said book number is book number within New Testament.

14. The audio bible player according to claim 11, wherein the memory stores all audio bible files of multiple bible translations/versions, wherein the player further comprises a change/selection key for a human operator to input a bible translation/version change/selection command, and wherein said controller receives said bible translation change/selection command, and finds the audio bible file of the same verse of a different translation/version, and controls said speaker or said earphone to play out sound from the audio bible verse file.

15. The audio bible player according to claim 11, further comprising two bible book navigation keys that enable a user to move from book to book back and forth in a sequential order, two chapter navigation keys that enable a user to move from chapter to chapter back and forth in a sequential order, and two verse navigation keys that enable a user to move from verse to verse back and forth in a sequential order.

16. The audio bible player according to claim 11, wherein said memory further stores bible text files in a similar way as audio files, and said controller controls a display to display bible text that is synchronized with the audio bible being played.

17. The audio bible player according to claim 11, wherein said controller is programmed to remember a last position it played when the audio bible player is turned off, and start playing automatically from said last position whenever said audio bible player is turned on again.

18. The audio bible player according to claim 11, further comprising a clock time display and an alarm,
   wherein a user enters both an alarm time and said numerical index of a bible verse to set up the alarm, and said controller stores the alarm time and the numerical index in the memory, and
   wherein said controller finds the corresponding audio bible file based on the stored numerical index, controls said output speaker or said earphone to play out the sound of the audio file, so the user is woken up at the alarm time by the bible verse the user entered in setting up the alarm.

19. The audio bible player according to claim 11, wherein said book number is book number within the whole bible.

20. The audio bible player according to claim 11, wherein the bible is selected from Christian bible, Catholic bible, Orthodox bible, and Jewish bible.

\* \* \* \* \*